(No Model.)

H. C. MONTGOMERY.
SELF CLOSING FAUCET.

No. 382,654. Patented May 8, 1888.

Witnesses.
Wm. M. Monroe.
Henry Lower.

Inventor.
Harry C. Montgomery,
by H. T. Fisher,
Attorney.

N. PETERS, Photo-Lithographer, Washington, D. C.

UNITED STATES PATENT OFFICE.

HARRY C. MONTGOMERY, OF CLEVELAND, OHIO.

SELF-CLOSING FAUCET.

SPECIFICATION forming part of Letters Patent No. 382,654, dated May 8, 1888.

Application filed August 6, 1887. Serial No. 246,263. (No model.)

*To all whom it may concern:*

Be it known that I, HARRY C. MONTGOMERY, a citizen of the United States, residing at Cleveland, in the county of Cuyahoga and State of Ohio, have invented certain new and useful Improvements in Self-Closing Faucets; and I do hereby declare that the following is a full, clear, and exact description of the invention, which will enable others skilled in the art to which it appertains to make and use the same.

The invention relates to improvements in self-closing faucets; and it consists in the construction shown and described, and particularly pointed out in the claim.

Figure 2:
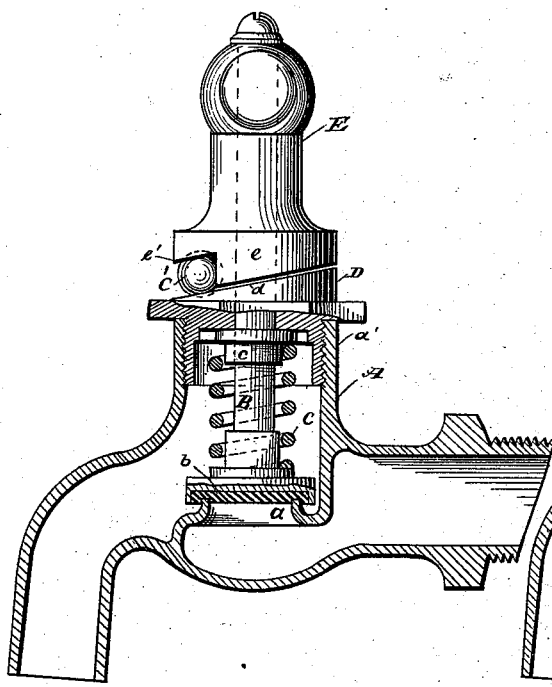
Figure 1:
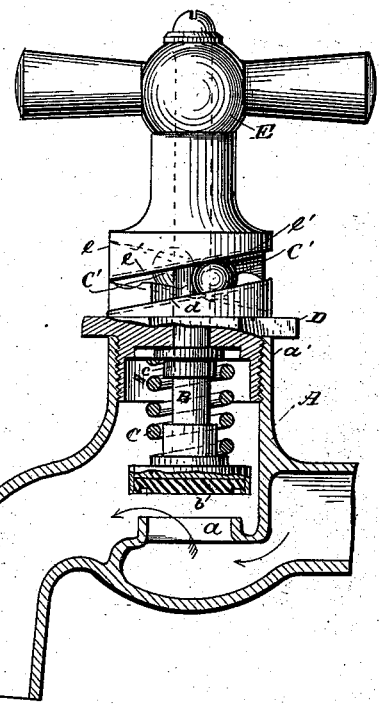
Figure 3:
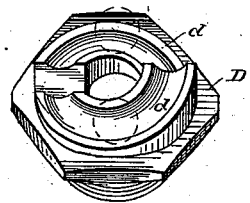
Figure 3:

In the accompanying drawings, Figure 1 shows a faucet in which the valve is closed. Fig. 2 is a faucet in which it is opened. Fig. 3 is a perspective of the inclined tracks or cams on which the key and balls are turned.

A represents the body of the faucet, having a valve-seat, $a$, with the usual fluid-passages on either side thereof, and a neck, $a'$, screw-threaded interiorly.

B is a valve-stem supporting a valve, $b$, at its lower end and carrying a spiral spring, C, which surrounds the stem B and rests on the valve within the neck $a'$. A sleeved washer, $c$, passes over the stem B and rests on the top of the spring C.

D is a nut threaded to screw into the neck $a'$ and compress the spring therein. This nut is provided in its top with two grooved and oppositely-inclined tracks or cams, $d$, each extending spirally half-way around the nut, as clearly seen in Fig. 3. These inclines are reduced to about fifteen degrees elevation, and are grooved to support anti-friction balls $c'$, one or more.

E is the key, sleeved to turn freely on the valve-stem B, and provided with a head, $e$, having grooved inclines $e'$, which are the counterpart in every particular of the inclines $d$. The key E is secured on the spindle by a screw and a washer on the end of the spindle in a well-known way.

It will be observed that the inclines on the nut D and the key E are straight from end to end, and that there are two pairs of inclines when the parts are united, as seen in Figs. 1 and 2, which are opposite one another and are but slightly separated by the interposed balls. The balls are just large enough to take the friction off the inclines, and this relief being obtained the inclines stand the same distance apart, whether the faucet is open or closed. When closed, the balls occupy recesses opposite one another in respect to the spindle, which are formed by the shoulders of the upper and lower inclines, respectively, one of which is on the nut D and the other on the key E; but these shoulders belong to the inclines, which work with the ball opposite to that which is interposed between them. These shoulders form position-stops for the balls and abut against the balls from opposite sides when the faucet is closed. The slight grooves in which the balls travel serve to imprison or hold the balls, so that no other protection is needed therefor about the sides of the inclines.

The operation of the device will be apparent from the foregoing description. The key being turned to the left, the balls ride up the incline, the spring is compressed, and the valve is opened. Although a spring of probably double or treble the tension hitherto used in the faucets of this general character is employed, the opening of the valve is much more easy than in the old faucets, first, by reason of the slight elevation of the inclined tracks, and, second, by reason of the anti-friction balls, which take the tension of the spring, and thus avoid friction between the two cam or inclined surfaces. This gives an easy rolling movement to the key, which not only facilitates manipulation, but when the valve resumes its seat, after the key is released by the hand, insures a gradual closing of the valve and avoids the hammering and strain in the pipes that is certain to follow when the valve is suddenly closed. The degree of elevation of the inclines I have stated at about fifteen degrees. It may probably be somewhat less. In any case it should be such that with a heavy spring the valve will be carried to its seat by a comparatively slow rolling movement on the inclined ways, instead of closing instantly and with a noise, as in the case where the abrupt inclines without balls or wheels are used. The use of the balls or wheels enables one to overcome the friction between the two inclined surfaces and to use inclines of much less elevation than could be used otherwise, and this insures the gradual closing of the valve, which is the object of my invention.

Having thus described my invention, what I claim as new, and desire to secure by Letters Patent, is—

In a self-closing faucet, a screw-nut having two straight inclines on its face, each extending half-way round and each incline terminating abruptly in a shoulder, in combination with a key having two straight inclines, each extending half-way round and terminating abruptly in a shoulder, the inclines on said nut and key running in parallel spiral lines, anti-friction balls between the opposite shoulders of the inclines above and below, which separate the key and nut slightly from each other, and a spring to press the nut against the key, substantially as set forth.

In testimony whereof I hereunto fix my hand.

HARRY C. MONTGOMERY.

Witnesses:
H. T. FISHER,
J. W. BABSON.